United States Patent
Huelamo Platas et al.

(10) Patent No.: US 6,603,970 B1
(45) Date of Patent: Aug. 5, 2003

(54) COMMUNICATIONS NETWORK SYSTEM WITH DISCRETE TERMINAL MOBILITY AND REMOTE USER REGISTRATION ASSOCIATED WITH SAID MOBILITY

(75) Inventors: Jose Javier Huelamo Platas, Madrid (ES); Daniel Gomez Mateo, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/315,952

(22) Filed: May 21, 1999

(30) Foreign Application Priority Data

Jun. 12, 1998 (ES) ................................. 9801246

(51) Int. Cl.[7] ........................ H04Q 7/20; G06F 15/16; G06F 15/173
(52) U.S. Cl. ..................... 455/435; 455/422; 455/433; 455/461; 709/202; 709/229
(58) Field of Search ................................. 455/403, 414, 455/422, 433, 435, 445, 456, 461, 558, 560; 709/229, 202, 224, 201

(56) References Cited

U.S. PATENT DOCUMENTS

| | | | | |
|---|---|---|---|---|
| 5,825,759 A | * | 10/1998 | Liu | 370/331 |
| 5,960,365 A | * | 9/1999 | Leih et al. | 455/552 |
| 5,978,672 A | * | 11/1999 | Hartmaier et al. | 455/413 |
| 6,021,331 A | * | 2/2000 | Cooper et al. | 455/507 |
| 6,275,709 B1 | * | 8/2001 | Do | 455/461 |
| 6,332,081 B1 | * | 12/2001 | Do | 455/461 |
| 6,336,130 B1 | * | 1/2002 | Do | 709/202 |
| 6,389,037 B1 | * | 5/2002 | Do | 370/469 |
| 6,490,613 B1 | * | 12/2002 | Do | 709/202 |

* cited by examiner

Primary Examiner—Nay Maung
Assistant Examiner—Raymond Persiño
(74) Attorney, Agent, or Firm—Sughrue Mion, PLLC

(57) ABSTRACT

A communications network system with discrete terminal mobility and remote user registration associated with said mobility, which comprises at least:

a terminal controller (TC) software component for maintaining and updating data of terminal configuration, access interface references of a provider agent (PA), conditions for accepting or rejecting remote user registrations, and for terminal registration or deregistration;

a terminal mobility management (TMM) software component for controlling data related to the terminal connection, creating or suppressing registered terminal agents (TA), checking discrete terminal mobility subscription, maintaining subscription agent (SubA) references of the subscribed terminals with discrete mobility, and obtaining references of terminal agents (TA) for terminals with discrete mobility in other federated retailer domains (1).

26 Claims, 10 Drawing Sheets

COMMUNICATIONS NETWORK SYSTEM WITH DISCRETE TERMINAL MOBILITY AND REMOTE USER REGISTRATION ASSOCIATED WITH SAID MOBILITY

The present invention relates to a communications network system with discrete terminal mobility and remote user registration associated with said mobility.

More specifically, the invention is implemented in a Telecommunication Information Networking Architecture, known as TINA, which is a distributed software architecture for telecommunications defined by an international consortium know as the TINA Consortium.

There are different forms of mobility in a communications system such as terminal mobility and personal mobility. The term mobility relates to the possibility of communication without being restricted to communicating from a fixed point.

Terminal mobility is the capability of a user terminal to be in motion while accessing and utilising the telecommunication services. The terminal has to identify itself by means of a unique terminal identity and independently of the point where it is connected to the network. The network, in turn, has to have the capability to continue locating the terminal while the latter is in motion.

Personal mobility is the capability of a user to initiate or join a service session, and to receive invitations to participate in a service session in different terminals located at various network connection points, based on a unique and personal identifier.

User registration is an inherent characteristic in personal mobility that is employed to indicate to the network in what terminal the user wishes to receive service session invitations based on certain conditions. The user registration can be local or remote with the characteristics that are stated below.

BACKGROUND OF THE INVENTION

Generally in a communications network, the terminal mobility can be either continuous if the terminal maintains a continuous connection while it moves, or discrete if connectivity with the network is lost insofar as the terminal moves from an access point to the network to another.

On the other hand, in the present methods of user registration within the personal mobility concept in TINA, the user cannot indicate, in the user registration, a remote terminal different from that being utilised at that moment, in other words, it is only possible to carry out local user registration.

The network architecture based on TINA does not support, at present, any type of terminal mobility, and, consequently, does not support discrete terminal mobility either. Consequently, a terminal connected to a network point cannot be disconnected and/or reconnected from/to any network access point.

Likewise, in order that the user can carry out user registrations in a remote manner, it is necessary to support some type of terminal mobility, like for example the discrete terminal mobility (hereinafter referred to as DTM); that is, a registration which permits the user to indicate a terminal different from the one used for carrying out the registration.

The network architecture based on TINA does not support remote user registration either.

At present, there are studies based on the employment of special bridges on Distributed Processing Environment (DPE) based on CORBA (Common Object Request Broker Architecture) that TINA proposes as DPE to be used, and a wireless network protocol termed Environment Specific Inter-ORB Protocol.

This option, however, requires changes in the CORBA-based DPE, without said changes being yet defined. Consequently, a solution is not yet available. In addition, said option considers the terminal mobility only in wireless networks and does not support discrete terminal mobility which can also be implemented in fixed networks.

It is therefore a question of conferring discrete terminal mobility (DTM) in the TINA network architecture and granting the possibility of providing remote user registration associated with said mobility.

SUMMARY OF THE INVENTION

The communications network system, object of the present invention, offers the possibility of including discrete terminal mobility (DTM) in a network architecture of the TINA type, as well as remote user registration associated with said mobility.

In this way, the terminals that support DTM can be connected and/or disconnected to/from any network access point of a fixed network. This discrete terminal mobility is achieved without having to use a mobility service of DPE based on CORBA, since said DPE service does not presently exist.

With respect to the possibility of remote user registration, the terminal where a user asks to receive a service session invitation has to be a mobile terminal of the DTM type, which is associated with a DTM service subscription in any retailer domain of the network, while the terminal that is used for giving the remote registration order can be fixed or mobile.

According to a preferred embodiment of the invention, the discrete terminal mobility is achieved by incorporating new software components in the communications network architecture. Said components are:

Terminal controller, which is located in the consumer domain and contains information relative to the terminal configuration such as terminal identity, terminal type, mobility type and network address.

Furthermore, the terminal controller serves for maintaining the access interface references for all access sessions opened in a DTM terminal, references that can be updated later if there have been changes during the connection of the terminal, and which are used for closing down the opened sessions.

Moreover, said terminal controller contains the conditions necessary for remote user registration, for example those for admitting or rejecting said remote registration based on certain conditions, like maximum number of remote registrations in a terminal.

Terminal controller front end, which is located in the consumer domain and is necessary only for DTM terminals. Its mission consists of acting as a medium through which a terminal provider can access the terminal controller functions for terminal registration or deregistration, and for handling the conditions for remote user registration and the terminal configuration values.

Terminal mobility manager, which is located in the retailer domain of the network. If said domain supports the DTM service, the terminal mobility manager acts for maintaining a terminal agent instance by representing each DTM terminal registered and with DTM subscription in its domain. In the event that the domain does not support the DTM service, it also acts as an intermediary for locating a DTM terminal in other retailer domains. It creates a terminal agent each time that a terminal carries out a terminal registration.

Terminal agent, which is located in the retailer domain of the network in which the DTM service is available, and serves for providing updated interfaces references in the terminal to the user agent.

These and further features of the present invention are described in more detail hereinbelow as well as in the claims.

DESCRIPTION OF THE PREFERRED EMBODIMENT

Figure 1:
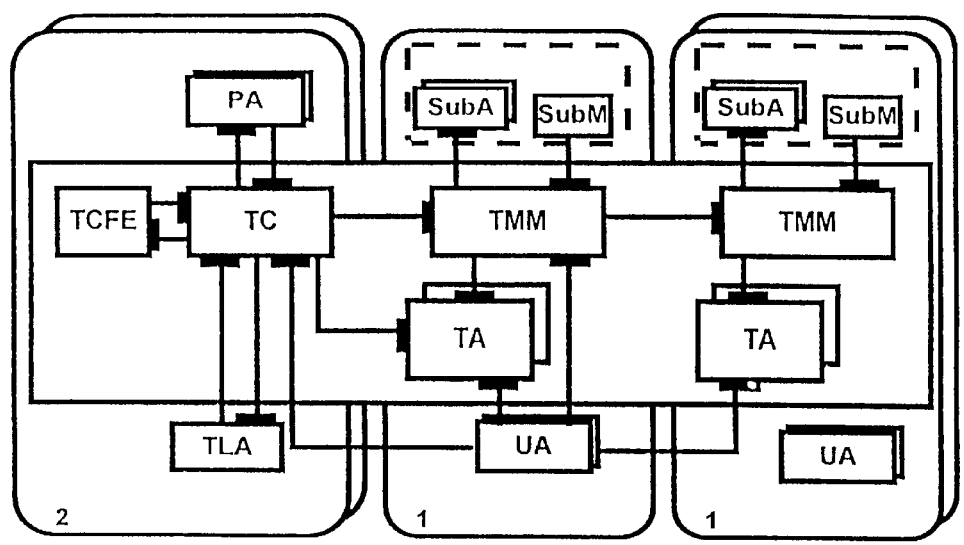
FIG. 1 is a schematic diagram of the network domains in which the new software components, object of the invention, intervene.

The TINA communications network system, over which is laid the TINA software architecture and, consequently, the new components that are proposed by the present invention, is formed by a set of switches, for example ATM switches, controlled through interfaces opened to TINA connection management components.

These components, together with the remaining components that form the TINA architecture are housed in the TINA user terminals such as personal computers or workstations, and in the nodes, which are normally also workstations, that control the network switches.

The TINA components are lodged on a DPE based on CORBA, which permits said nodes and terminals to have different software/hardware technologies or manufacturers. These nodes and terminals having a DPE core are interconnected with each other forming what is called the transport network for the DPE cores, or Kernel Transport Network (KTN). The connections for streamed data, like video and audio signals, are controlled by means of the TINA connection management components that act on the switches that make up the transport network. The KTN network can be an independent network or it can be a network that makes use of connections in the transport network.

To better understand the object of the present invention a description of certain concepts that intervene in its functionalities is first given.

a) The terminal identity is used to identify all types of terminals, constituting a unique value for each terminal. It is also used for identifying public terminals when a user tries to carry out a remote user registration. To this end, the terminal identity is presented in a streamed form as in this way it is easier to be employed by the human user. Consequently, the long type of terminal identity that is proposed by the known retailer reference point (Ret-RP) is replaced by the streamed type proposed by this invention.

The mobile terminals (for example DTM terminals) subscribe to a retailer domain. For this type of terminals, the terminal identity is also used for knowing said retailer domain in which a mobile terminal is subscribed.

This stream shall include a part called the retailer identity that shall be absent in the case of fixed terminals. Said retailer identity is associated with the streamed type retailer identity known in the aforementioned retailer reference point (Ret-RP).

The terminal identity is also used as context name for access sessions, as well as for making remote user registrations. In addition, as will be explained below, the user agent (UA) employs this identifier to contact the terminal mobility manager (TMM) for obtaining the corresponding reference of the terminal agent (TA).

b) The network address is an E164 address that corresponds to a network access point, for example for asynchronous transfer mode (ATM) networks. The external equipment that can be attached to a network access point can be a terminal or a federated network. Each network access point of a connection, for example in ATM networks, has a network address associated with it.

Each terminal is connected to an individual network access point that is identified with a network address. In a fixed terminal, the network address for said terminal is fixed; and in a mobile terminal, the network address for this terminal changes each time the terminal is connected to a different network access point.

c) The terminal configuration contains information relative to the terminal identity, terminal type, mobility type and network address, among other items.

d) The conditions for remote user registration are set by a terminal provider for accepting or rejecting the remote user registration in the terminal. Some examples of these conditions are mentioned in the following description.

e) The term federated in this specification is to be understood in reference to a set of domains or components belonging to a communications network of the TINA type.

f) The service session user application corresponds to the software of a graphics user interface that permits access to the TINA services.

The communications network system, object of the present invention, is implemented in a communications network with distributed software, preferably of the TINA type, which as can be seen from FIG. 1 can be divided into retailer domains (1) and consumer domains (2).

Each retailer domain (1), incorporates the following software components of the standard TINA type:

User agent (UA), which represents the end user or the subscriber when participating in service sessions;

Service sessions manager (SSM), which serves for managing the service session instances;

Subscription agent (SubA), which serves for controlling the subscriptions available for a user or a terminal; and Subscriber manager (SubM), which serves for managing the subscribers and users or terminals of a service subscription.

The last two components, that is the subscription agent (SubA) and the subscriber manager (SubM), are included in the part corresponding to subscription management.

In turn, each consumer domain (2) incorporates the following software components:

Provider agent (PA), which represents the provider of the services supported in the terminal;

Terminal layer adapter (TLA), which serves for managing a specific layer technology within the terminal, like ATM for example; and Service session user application (ssUAP), which as its name indicates, represents the user application and is located in the consumer domain.

The operations related to the interfaces, besides their textual description, are presented with indication of each operation and its input, output, or input/output parameters.

The communications network system object of the present invention incorporates, in addition, four new software components that confer the network the possibility of supporting discrete terminal mobility and remote user registration in association with said mobility.

These components are:
terminal controller (TC);
terminal controller front end (TCFE);
terminal mobility manager (TMM); and
terminal agent (TA).

The terminal controller (TC) is located in the consumer domain (2) and contains information relative to the terminal configuration such as terminal identity (terminal_id), terminal type (terminal_type), mobility type (mobility_type) and network address which shall be described later.

Furthermore, the terminal controller (TC) serves for maintaining the access interface references of an access session opened in a DTM terminal, references that can subsequently be updated and be used for closing down the sessions opened.

Moreover, said terminal controller (TC) contains the conditions necessary for remote user registration, for example those for admitting or rejecting said remote registration based on some conditions, or for impeding/enabling access to the terminal after a remote registration has been accepted.

The terminal controller (TC) has certain functionalities that are common to both fixed and mobile terminals including some specific functionality about mobility type.

The main functionality common to all types of terminal mobility (mobility_type) are the functions related to the handling of the terminal configuration.

The terminal configuration consists of terminal identity, terminal type, mobility type and network address, and is obtained by invoking the corresponding operation by the provider agents (PA). Likewise, the network address corresponding to the network access point, for example for ATM (asynchronous transfer mode) networks where the terminal has been connected, is in the terminal configuration. The terminal layer adapter (TLA) is informed by the terminal controller (TC) of the network address that has to be used. A component termed terminal communications sessions manager (TCSM) obtains the network address from the terminal layer adapter (TLA). This latter can obtain the corresponding interface reference in the terminal controller (TC) by using a naming service.

The naming service is a service of the DPE that consists of providing the reference to an interface based on a marker, which permits an interface or set of interfaces to be identified.

The network address can be obtained from the terminal controller (TC) by the terminal layer adapter (TLA) when the latter is instanced. This is the normal procedure for fixed terminals.

The main functionality specific to DTM type mobility (mobility_type=DTM) consists of the following:

It checks the authentication data of the terminal provider that is accessing the terminal controller front end (TCFE) before providing the latter with the access interface reference of the terminal controller (TC);

It contains the updated version of the network address corresponding to the network in which the terminal has been connected.

Said address is indicated by the terminal provider through the terminal controller front end (TCFE) in DTM terminals and by inicialisation in fixed terminals, and is transmitted to the terminal layer adapter (TLA). When a terminal registration is ordered, this order is transmitted to the terminal mobility manager (TMM) and the latter creates a corresponding terminal agent (TA) that represents a DTM terminal registered in the retailer domain (1). The terminal controller (TC) updates the network address of the terminal layer adapter each time a new terminal registration is carried out. The terminal controller (TC) obtains the reference from the terminal layer adapter (TLA) by using a naming service. This mechanism permits the terminal layer adapter (TLA) to have the network address always in an updated state. The terminal controller (TC), further, offers an operation for indicating to the terminal mobility manager (TMM) the deregistration of the terminals, in which case said terminal mobility manager (TMM) suppresses the corresponding terminal agent (TA), and the terminal controller (TC) invokes in the terminal layer adapter (TLA) the operation of unavailability of the network address present in the latter and in the terminal controller (TC). The terminal controller obtains the reference of the terminal mobility manager (TMM) by means of a naming service utilising as a marker the retailer identity corresponding to the retailer in which the terminal has the subscription to the DTM service. The terminal registration and deregistration are initiated by the terminal provider using the terminal controller front end (TCFE);

It maintains the access interface references of the provider agent (PA) of the access sessions opened in the DTM terminal. These references are updated in the terminal controller (TC) by the provider agent (PA). Before disconnecting the terminal, the terminal controller (TC) uses these references for closing down all the access sessions opened in the terminal.

It contains the conditions set by the terminal provider for accepting or rejecting remote user registrations. A possible simple condition can be the maximum number of remote registrations in the DTM terminal (this type of registration cannot be made in fixed terminals), it being possible that said conditions be more complex. These conditions are checked before accepting a remote user registration coming from a user agent (UA) using the terminal registration interface of the terminal controller (TC). The terminal controller (TC) displays a message on the terminal display making use of a message visualiser for providing information about the remote registration or the deregistration that is about to occur.

The terminal controller (TC) requires a series of software interfaces in its peripheral components for enabling the operations of which mention has been made in the preceding paragraphs with respect to functionalities. These interfaces are:

Access interfaces of the provider agents (PA). To obtain the updated references of these interfaces, the provider agent (PA) invokes the operation of registration or deregistration of access sessions in the terminal controller (TC). When the terminal is disconnected, the terminal controller (TC) will invoke, in the provider agents (PA), an access session closing operation by using references received in the access interface of the provider agent (PA), thereby closing down all the sessions opened;

Network address interface of terminal layer adapters (TLA). To obtain the references of this interface, use is made of a naming service. When a registration or a deregistration of a terminal is carried out, the terminal controller (TC) invokes the operations corresponding to the updating of the network address or to the unavailability of the network address of the terminal layer adapter (TLA), respectively;

Initial interface of a terminal mobility manager (TMM). To obtain the references of this interface, use is made of a naming service based on the identity of the retailer. This interface is only necessary for DTM terminals;

Access interface of a terminal mobility manager (TMM). The references of this interface are obtained through the initial interface of the terminal mobility manager (TMM) when the authentication data are correct. This interface is only required for DTM terminals; and Interface for updating the conditions of remote user registration in terminal agents (TA). The references of this interface are obtained through the terminal mobility manager when a terminal registration is carried out. The operation of this interface depends on the conditions of remote user registration supported.

The terminal controller (TC) provides a series of software interfaces which enable it to communicate with the remaining components of the network in order to make possible the operations of which mention has been made in the preceding paragraphs with respect to functionalities. These interfaces are:

Initial interface for a terminal controller front end (TCFE) component, which is supported by the DTM terminals, the references of which are obtained via a naming service. The operation is:
Obtain_Access_Int_Ref (
input Provider identity,
input Terminal provider password,
output Interfaces references list).

In the above, the terms input and output refer to parameter input and output, respectively.

If the authentication data are correct, the operation returns a set of interface references of the terminal controller (TC), such as for example the reference of the access interface to be used by the terminal controller front end (TCFE) component. This interface could contain an operation for the change of password.

Access interface for the terminal controller front end (TCFE) and supported by the DTM terminals. The references of this interface are obtained by means of the initial interface of the terminal controller (TC). This interface provides the terminal controller front end (TCFE) component with three types of operation that can be associated with different interfaces of the terminal controller (TC) and can be supplied to the terminal provider depending on whether the terminal provider is a propietor or a manager.

The first type of these operations is associated with the registration or deregistration of DTM type terminals. Checking of the mobility type is also carried out to ensure whether there is discrete mobility or not. The operations are:
Obtain_Mobility_Type ( )
Obtain_Terminal_Registration_info (
output Network address)
Terminal Registration (
input Network address).

The terminal controller (TC) transmits the order to the terminal mobility manager (TMM). This, acting jointly with the subscription agent (SubA) checks the DTM service subscription, and if the result is affirmative, the terminal mobility manager (TMM) creates the corresponding terminal agent (TA) that represents the registered and connected DTM terminal.

Terminal_Deregistration ( ).

For deregistration, the terminal controller transmits the corresponding order to the terminal mobility manager (TMM) and the latter proceeds to suppress the corresponding terminal agent (TA).

The second type of operation is associated with the handling of conditions for remote user registration. In the first place, the conditions for remote user registration are established. Certain simple conditions of remote user registration are related to the maximum number of remote registrations, or to a list of users with access permitted or denied. When a remote user registration is requested, a check is made of these conditions in order to accept or reject remote user registration. The operations are:
Establish Remote User Registration_Condition (
input Condition for remote user registration)
Obtain_Remote_User_Registration_Condition (
output Condition for remote user registration).

The third type of operation is associated with the terminal configuration in which values in the terminal configuration are established or modified, like for example, terminal identity, terminal type and network address. The operations are:
Establish_Terminal_Configuration (
input Terminal configuration)
Obtain_Terminal_Configuration (
output Terminal configuration).

Terminal configuration interface for a provider agent (PA), which is supported by both fixed and mobile terminals. The references of this interface are obtained by using a naming service. The operation is:
Obtain_Terminal_Configuration (
output Terminal configuration).

The terminal configuration in this operation mainly comprises terminal identity, terminal type and mobility type. When an access session is established, the first operation that the provider agent (PA) has to invoke in the user agent (UA) is the setting up of a user context. If this is not invoked, it shall not be possible to use the access session and all remaining invoked operations shall output an access error alert. The operation of setting up a user context contains specific information related to the terminal configuration. To introduce this information, the provider agent (PA) obtains it invoking the terminal configuration interface of the terminal controller;

Access session registration interface for a provider agent (PA), supported by DTM terminals. The references of this interface are obtained by using a naming service. The provider agents (PA) carry out the registration or deregistration of their access session interface references in terminals. The terminal controller (TC) uses these references to close down all the access sessions opened in the terminal when the latter is disconnected, by invoking the access session closing operation in the provider agent. The operations are:

Access_Session_Registration (
input Access interface reference of the access area)
Access_Session_Deregistration (
input Access interface reference of the access area).

Network address interface for a terminal layer adapter (TLA), supported by fixed and mobile terminals and the references of which are obtained by using a naming service. The operation is:

Obtain_Network_Address (
output Network address).

Consumer initial interface for a user agent (UA), supported by DTM terminals. The user agent (UA) obtains this reference through the terminal agent (TA) after interacting with the terminal mobility manager (TMM). This interface is defined in the retailer reference point (Ret-RP) associated with the provider agents (PA).

The only completely necessary operation of those which have been defined in said retailer reference point is the invitation to a user outside an access session operation. The operation is:

Invitation_Outside_Access_Session (
input Provider identity,
input Service session invitation,
output Invitation answer).

The provider identifier identifies the retailer from which the invitation was originated.

This operation is used by the user agent (UA) to transmit invitation sessions to the terminal. The fixed terminals can only receive invitation sessions within an access session and the mobile terminals can receive session invitations associated with prior remote user registrations coming from the corresponding user agents (UA).

The terminal controller (TC) displays a message on the terminal display making use of the message visualisers in the terminal controller front end (TCFE), for informing of the incoming invitation session. An example of this type of message is: "a session invitation associated with service X has been received by user Y". If the invited user wishes to participate in the session, the session participation process will have to be initiated within an access session and through the provider agent as is proposed in TINA.

Terminal registration interface with the user agent (UA), supported by the DTM terminals. The user agent (UA) obtains this reference through the terminal agent (TA) after having acted in connection with the terminal mobility manager (TMM). The operations are:

Remote_User_Registration (
input User identity,
input User context name)
Remote_User_Deregistration (
input User identity,
input User context name).

The terminal provider (TP) can establish conditions for accepting or rejecting remote user registrations. A simple condition can be the maximum number of remote registrations in the DTM terminal, although there can be other more complex conditions.

The conditions are checked before admitting a remote user registration coming from a user agent (UA). The terminal controller displays a message on the terminal display making use of the message visualiser to inform of the incoming remote registration or deregistration. An example of this type of message is: "A remote user registration has been carried out by user X from terminal Y".

Consumer terminal interface for a user agent (UA), supported by the DTM terminals. The user agent (UA) obtains the reference of this interface through the terminal agent (TA), which acts jointly with the terminal mobility manager (TMM). This interface is defined in the retailer reference point (Ret-RP) associated with the provider agents.

The second software component for a communications network architecture that the present invention contemplates is the terminal controller front end (TCFE). This component is located in the consumer domain (2) and is only necessary for DTM terminals. Its main purpose consists of serving as a front end interface in order that a terminal provider, after having provided the correct authentication data, can have access to the functions of the terminal controller (TC) component in order to register or deregister a terminal, to handle the conditions of remote user registration and the terminal configuration.

The terminal controller front end (TCFE) interface serves also to display some messages on the terminal display when an invitation session arrives outside an access session, and the registration or deregistration of a remote user registration has been carried out in the terminal.

This terminal controller front end (TCFE) component requires an initial interface and an access interface in the terminal controller (TC), and supports another corresponding interface for message display. Each message is in the form of a bit stream. With this operation, two types of message can be displayed, such as, for example: "a remote user registration has been carried out by user X from terminal Y", or "an invitation session associated with service X has been received for user Y". The operation is:

Message_Display (
input Message).

The third software component for a communications network architecture that the present invention contemplates is the terminal mobility manager (TMM), which is located in the retailer domain (1). If said retailer domain (1) does not support the DTM service, then the terminal mobility manager (TMM) component shall only act as a simple intermediary (without creating terminal agents) between the user agent (UA), that requires a terminal agent (TA) reference based on a terminal identifier, and the terminal mobility managers (TMM) belonging to a federated retailer domain in which the corresponding DTM terminal is subscribed.

The common functionality of the terminal mobility managers (TMM) is mainly based on that they are capable of locating DTM terminals registered in other retailer domains (1) that act in association with other terminal mobility managers (TMM) in federated retailer domains (1) in order to obtain their terminal agent (TA) references based on the terminal identifiers received from the user agents (UA). The terminal identifier obtains from the DTM terminals the identifier of the retailer where the DTM terminal is subscribed to the DTM service. The terminal mobility manager (TMM) obtains the federated terminal mobility manager (TMM) reference by using a naming service based on said retailer identifier. In a retailer domain where the DTM service is not available, the terminal mobility manager (TMM) need not create a terminal agent (TA) for which reason the latter is not necessary.

When the retailer domain offers DTM services, the main functionality of the terminal mobility manager (TMM) consists of the following:

To control the position of all the DTM terminals with DTM subscription service in the corresponding retailer domain (1), creating or suppressing the terminal agents (TA) that represent terminals registered in the retailer domain (1).

When a DTM terminal is connected to the network, the terminal provider (TP) requires, through the terminal controller front end (TCFE), the registration of the DTM terminal. In the registration, the terminal mobility manager (TMM) acts in association with the corresponding subscription agent (SubA) for checking the DTM subscription.

To maintain the subscription agent (SubA) references corresponding to all the DTM terminals having DTM service subscription in a retailer domain (1).

When a DTM terminal is created in the subscription management subsystem, a subscription agent (SubA) is created without the creation of a user agent (UA), and the subscriber manager (SubM) informs the terminal mobility manager (TMM) of the new terminal subscribed, and its subscription agent (SubA) reference is passed to the terminal mobility manager (TMM).

When a terminal is suppressed from a subscription management subsystem, the subscriber manager (SubM) informs the terminal mobility manager (TMM) of the suppresion. At this moment, the terminal mobility manager (TMM) suppresses the corresponding subscription agent (SubA) reference and suppresses the corresponding terminal agent (TA), if present.

The terminal mobility manager (TMM) requires initialising conditions which have to be configured with the information relative to the provider identity corresponding to said retailer domain, and the list of all retailer identifiers corresponding to their federated domains.

In addition, the terminal mobility manager (TMM) requires the following interfaces:

Service use interfaces of the subscription agent (SubA), the references of which are obtained through the subscriber manager (SubM) when a new terminal is subscribed to the DTM service. The subscription agent (SubA) operations invoked by the terminal mobility manager (TMM) are those of subscription and authentication data checking. The subscription agent (SubA) interfaces are only needed in the retailer domain that provides the DTM service.

Interfaces for federated terminal mobility managers (TMM) of the terminal mobility manager (TMM), the references of which are obtained by means of a naming service based on the retailer identifier, included in the terminal identity received, corresponding to the federated retailer domain. Certain authentication data can be necessary for security reasons.

Initial interface of terminal agents (TA), the reference of which is obtained by using a naming service. This interface is only necessary in the retailer domain that provides DTM service.

The terminal mobility manager (TMM) provides the following interfaces:

Initial interface for the terminal controller (TC) of the DTM terminals, the references of which are obtained by means of a naming service based on the retailer identity. The operation is:
Check_Terminal_Provider_Password (
input Provider identity,
input Terminal provider password,
output Access interface reference).

The operation with respect to this interface consists of transmitting the subscription checking order to the subscription agent (SubA), the checking of the authentication data received being carried out in the subscription management subsystem. If the data are correct, the operation returns the reference of the access interface of the terminal mobility manager (TMM). The interface can also include a password changing operation.

Access interface for the terminal controller (TC) of the DTM terminals, the reference of which is obtained through the initial interface of the terminal mobility manager (TMM). The operations corresponding to this interface consist of terminal registration and deregistration using terminal identifiers. The operation is:
Terminal_Registration (
input Terminal identifier,
input List of interface references of the TC).

In the terminal registration, the terminal mobility manager (TMM) acts in association with a subscription agent in order to check the DTM subscription. If the check is affirmative, a terminal agent (TA) is created for representing the registered DTM terminal that holds the provided references to the terminal controller (TC) (consumer initial interface, terminal registration interface). In a terminal deregistration, the terminal mobility manager (TMM) suppresses the corresponding terminal agent. The operation is:
Terminal Deregistration (
input Terminal identity).

Terminal access interface for the user agents (UA), that are located in the same retailer domain. Its reference is obtained by means of a naming service. The operation is:
Obtain_Terminal_Agent_Access_Interface_Reference (
input Terminal identity,
output Terminal agent access interface reference).

According to the operation that this interface provides, a user agent (UA) in the retailer domain (1) can act in association with the terminal mobility manager (TMM) for asking for a reference for a terminal agent (TA) corresponding to the terminal identity used in the process of remote user registration. If the DTM terminal is subscribed to the DTM service in the same retailer domain (1), the terminal agent (TA) reference will be given, and if the latter does not exist, the user agent (UA) shall be informed. If the DTM terminal is subscribed to the DTM service in a federated retailer domain, the terminal mobility manager (TMM) acts in association with the corresponding terminal mobility manager (TMM) in the federated domain for asking for the terminal agent (TA) reference. If the terminal is registered, the terminal mobility manager (TMM) will provide a terminal agent (TA) reference. Finally, the user agent (UA) acts with respect to the terminal agent (TA) in the same or another retailer domain (1) for obtaining an access interface reference with the terminal controller (TC).

Interface with other federated terminal mobility managers (TMM), the reference of which is obtained by means of a naming service based on the provider identity, that is located in a list of identities that corresponds to the domain of the federated retailers and is received in the initialisation of the terminal mobility manager (TMM), included in the terminal identity received, and corresponding to the federated retailer domain. Moreover, some authentication data can be necessary for security reasons. The operation is:
Obtain_Terminal_Agent_Access_Interface_Reference (
input Terminal identity,
output Terminal agent access interface reference).

The DTM terminals can have DTM subscription in various retailer domains and the federation formed between the terminal mobility managers (TMM) is used to obtain the reference of a DTM terminal in another retailer domain.

Information interface for subscription management for the subscriber manager (SubM) of the same retailer domain in which the DTM service is provided. The reference of this interface is obtained by means of a naming service.

When a DTM terminal is created in the subscription management subsystem, a new subscription agent (SubA) is created without a user agent (UA) being created, and the subscriber manager (SubM) informs the terminal mobility manager (TMM) of the newly subscribed terminal, and its subscription agent (SubA) reference is passed to the manager (TMM). The operation is:

Subscribed_Terminal ( input Terminal identity, input Usage service interface reference of subscription agent).

When a DTM terminal is suppressed from the subscription management subsystem, the subscriber manager informs the terminal mobility manager (TMM) of the suppressed terminal. Afterwards, the terminal mobility manager (TMM) suppresses the corresponding subscription agent (SubA) reference and removes the corresponding terminal agent, if the latter is present. The operation is:

Suppressed_Terminal ( input Terminal identity).

The fourth software component for a communications network architecture that the present invention contemplates is the terminal agent (TA) which is only necessary in the retailer domains (1) where the DTM service is provided. The terminal agent (TA) instances are created or suppressed by the terminal mobility manager (TMM) when a DTM terminal is registered or deregistered. The terminal agent represents the terminals that have carried out a terminal registration in a retailer domain (1) after a network connection.

A terminal agent (TA) instance is characterised in that:

It comprises an access interface and an interface for updating the conditions of remote user registration;

It represents a DTM terminal registered in the retailer domain (1);

It contains a set of updated references of terminal controller (TC) interfaces to provide to a user agent (UA). The references considered are related to consumer initial interface and terminal registration interface; and It maintains certain remote user registration conditions up to date, which, if needed, can be provided through the terminal controller (TC).

The terminal agent (TA) supports the following interfaces:

Initial interface, which as has been mentioned above is required by the terminal mobility manager (TMM) for creating and suppressing terminal agents (TA). This interface is provided in the retailer domain offering DTM service and is used for creating the terminal agent (TA). The reference of this interface is obtained by means of a naming service. The operation is:

Create_Terminal_Agent ( input Terminal identity, input Terminal controller interfaces list output Terminal controller interfaces list).

The mentioned terminal controller (TC) references of consumer initial interface and terminal registration interface are provided in an updated form to the user agent (UA) for accessing to the DTM terminal when an invitation is received from a service session outside an access session. For the terminal deregistration process, the operation is:

Suppress_Terminal_Agent ( input Terminal identity).

Access interface for the user agent (UA) in the same retailer domain, the reference of which can be obtained by means of a naming service. The operation is:

Obtain_Terminal_Controller_Interfaces_Reference ( input User identity, output Terminal controller registration interfaces list).

The operation corresponding to this interface consists of obtaining a list of updated references of the terminal controller (TC) interfaces for the user agent (UA) of the user requesting it, and the access points for participating in the service.

Interface for updating the conditions of remote user registration for the terminal controller (TC). The terminal controller (TC) obtains this reference through the terminal mobility manager (TMM) once the terminal registration has been carried out. The interface can be used for updating data in the terminal agent (TA) associated with the remote user registration conditions and established by the terminal provider; for example for ordering disabling of a previously accepted remote user registration in order to prevent access to the terminal if a session invitation should reach the user agent. This interface is not necessary for simple conditions of remote user registration such as for example maximum permitted number of remote user registrations.

To facilitate a better understanding of the main functions incorporated in the object of the present invention, a description is given below of the scenarios corresponding to them with the help of FIGS. 2 to 10.

Figure 2:
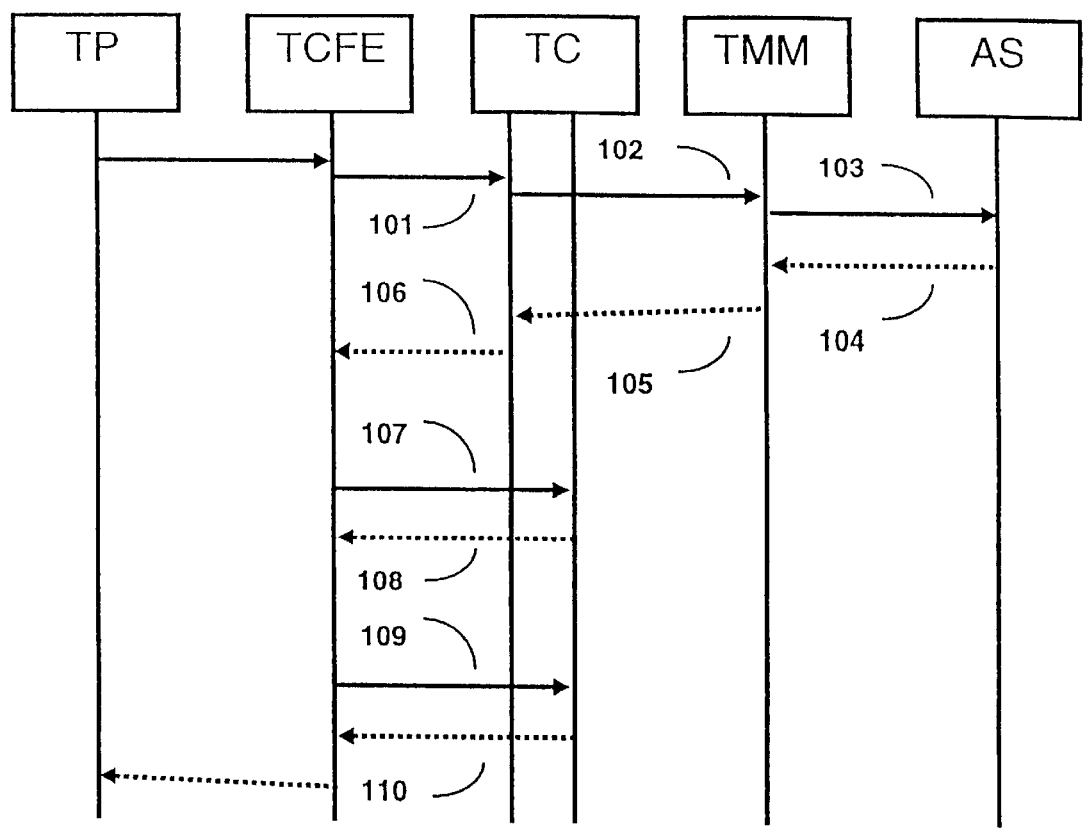
FIG. 2 shows a scenario that corresponds to the access of a terminal provider to the terminal controller front end.

FIG. 2 shows an implementation scenario of access to the terminal controller (TC) by a terminal provider (TP) through the terminal controller front end (TCFE). In this figure, it can be seen that in step (101) the terminal controller front end (TCFE) on a direct request of the terminal provider (TP), requests the initial interface of the terminal controller (TC) to obtain access. The access interface of the terminal controller (TC), in turn, requests the initial interface of the terminal mobility manager (TMM) for access to the latter. The terminal mobility manager (TMM), in step (103), checks the password of the terminal identity in an authentication server (AS). Once the authentication has been performed, confirmation replies are sent successively from the authentication server (AS) to the terminal controller front end (TCFE) as is illustrated in steps (104), (105) and (106).

Next, in steps (107) and (108), respectively, the terminal controller front end (TCFE) requests the access interface of the terminal controller (TC) for the mobility type, the latter replying with the corresponding mobility type.

Finally, in the event that mobile access is concerned, the terminal controller front end (TCFE) requests information on the terminal registration in step (109) and receives the reply to said information, for example if it is registered or not, and, if it is registered, the network address is provided, as can be seen in step (110).

Figure 3:
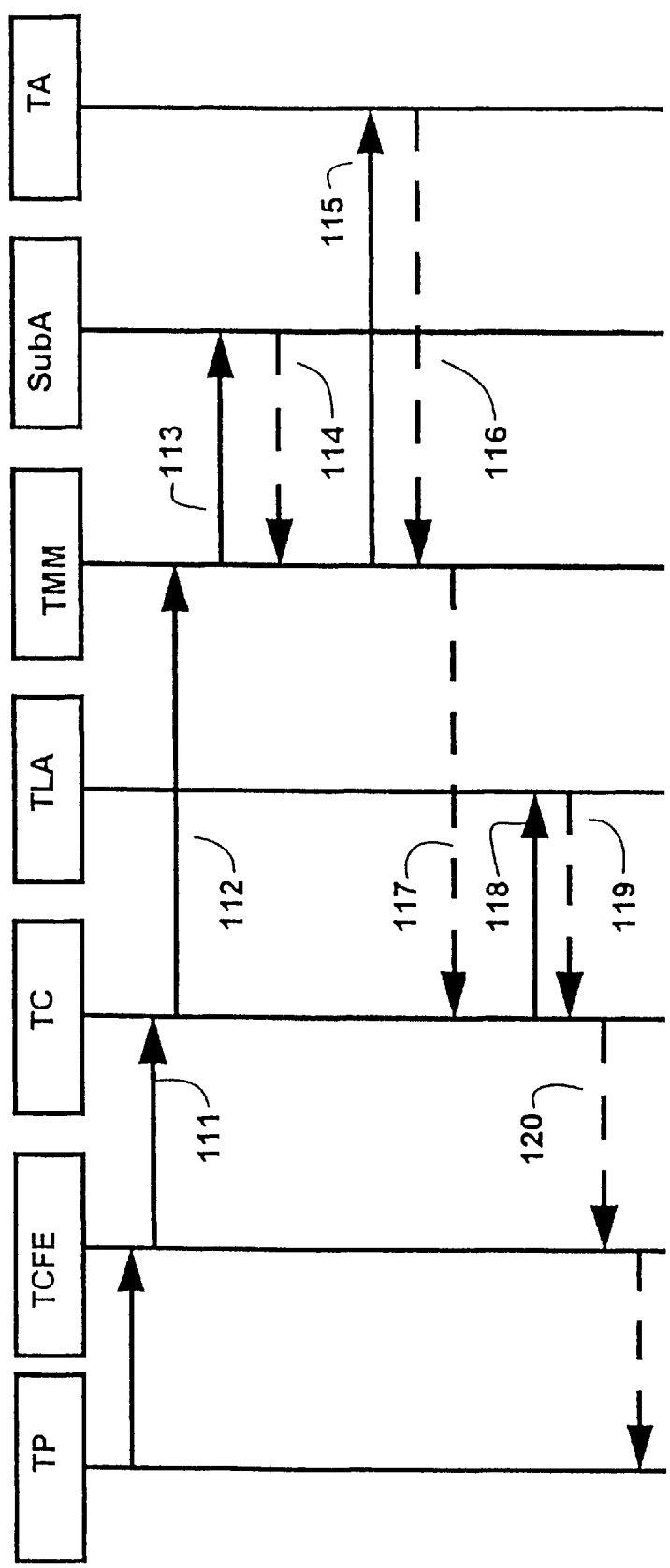
FIG. 3 shows a scenario that corresponds to a terminal registration process.

FIG. 3 relates to a scenario on terminal registration in which it can be seen in step (111) that the terminal controller front end (TCFE) on request of the terminal provider (TP) requests the access interface of the terminal controller (TC)

for a terminal registration. The terminal controller (TC), in turn, makes the same request, in step (112) to the access interface of the terminal mobility manager (TMM). The terminal mobility manager (TMM) checks, in step (113), the subscription of said terminal in the subscription agent (SubA). Once confirmation has been received from the latter, step (114), the terminal mobility manager (TMM) creates a terminal agent (TA) and receives a reference corresponding to said terminal agent (TA) in steps (115) and (116).

The terminal mobility manager (TMM) provides the reference obtained to the terminal controller (TC) in step (117). The latter, in step (118), establishes a network address in the corresponding interface of the terminal layer adapter (TLA). Once the network address has been established, it is returned as can be seen in steps (119) and (120), respectively.

Figure 4:
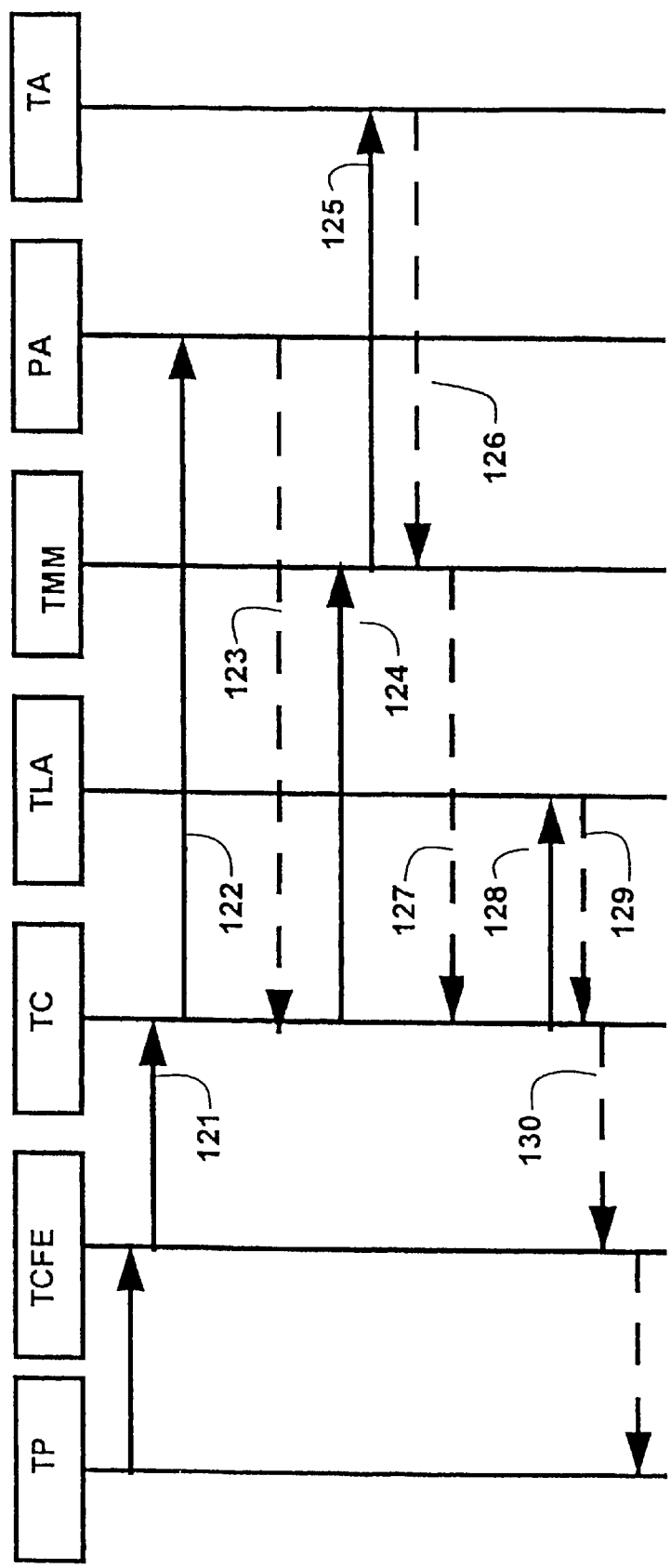
FIG. 4 shows a scenario that corresponds to a terminal deregistration process.

FIG. 4 presents a scenario of a terminal deregistration. In step (121) the terminal controller front end (TCFE) on request of the terminal provider (TP), asks the access interface of the terminal controller (TC) for a terminal deregistration. The terminal controller (TC) sends the provider agents (PA) the message for closing down all access sessions to customers on a terminal and receives confirmation from the provider agents, as can be seen in steps (122) and (123), respectively. Subsequently, it sends the deregistration request, in step (124), to the access interface of the terminal mobility manager (TMM). The terminal mobility manager (TMM) suppresses the terminal agent (TA) and receives the corresponding confirmation of suppression of said terminal agent (TA) in steps (125) and (126).

The terminal mobility manager (TMM) provides the deregistration information to the terminal controller (TC) in step (127). The latter, in step (128), proceeds with suppressing the network address in the corresponding interface of the terminal layer adapter (TLA). Once the return message from the terminal layer adapter (TLA) regarding the suppression of the network address has been received, in steps (128) and (129), respectively, the terminal controller (TC) sends a deregistration response to the terminal controller front end (TCFE), as can be seen in steps (129) and (130), respectively.

Figure 5:
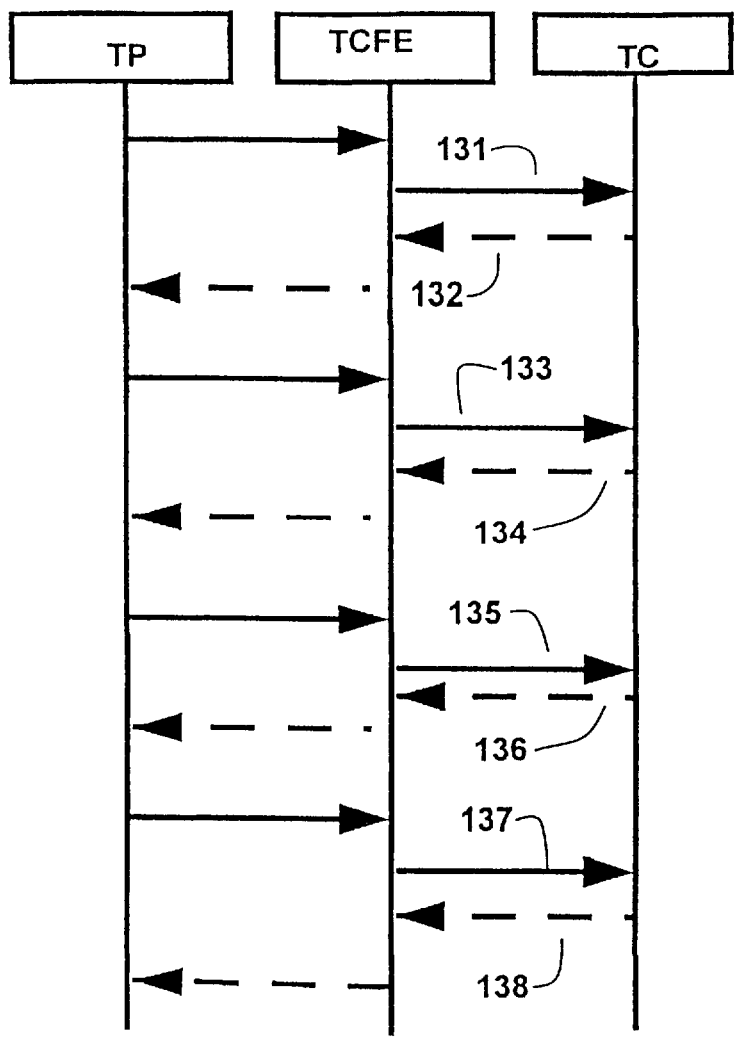
FIG. 5 shows a scenario that corresponds to a terminal configuration and remote user registration conditions handling process by a terminal provider.

In FIG. 5 the handling of the terminal configuration and the conditions of the remote user registration can be seen. With regard to a mobile access, it can be seen from step (131) that the terminal controller front end (TCFE), on request from the terminal provider (TP), asks the terminal controller (TC) for the maximum number of registered users, as an example of condition for remote user registration, the answer to which is received in step (132). In step (133) the terminal controller front end (TCFE), on request from the terminal provider (TP), requests the terminal controller (TC) to establish a new maximum number of registrations, the answer to which is received in step (134).

With respect to all terminal types (fixed and mobile) it can be seen in step (135) that via the terminal controller front end (TCFE), and upon request of the terminal provider (TP), it is possible to request the terminal controller (TC) to obtain the terminal configuration, the response to which is received in step (136). In step (137) the terminal controller front end (TCFE) requests the terminal controller (TC) to establish a new terminal configuration, the response to which is received in step (138).

Figure 6:
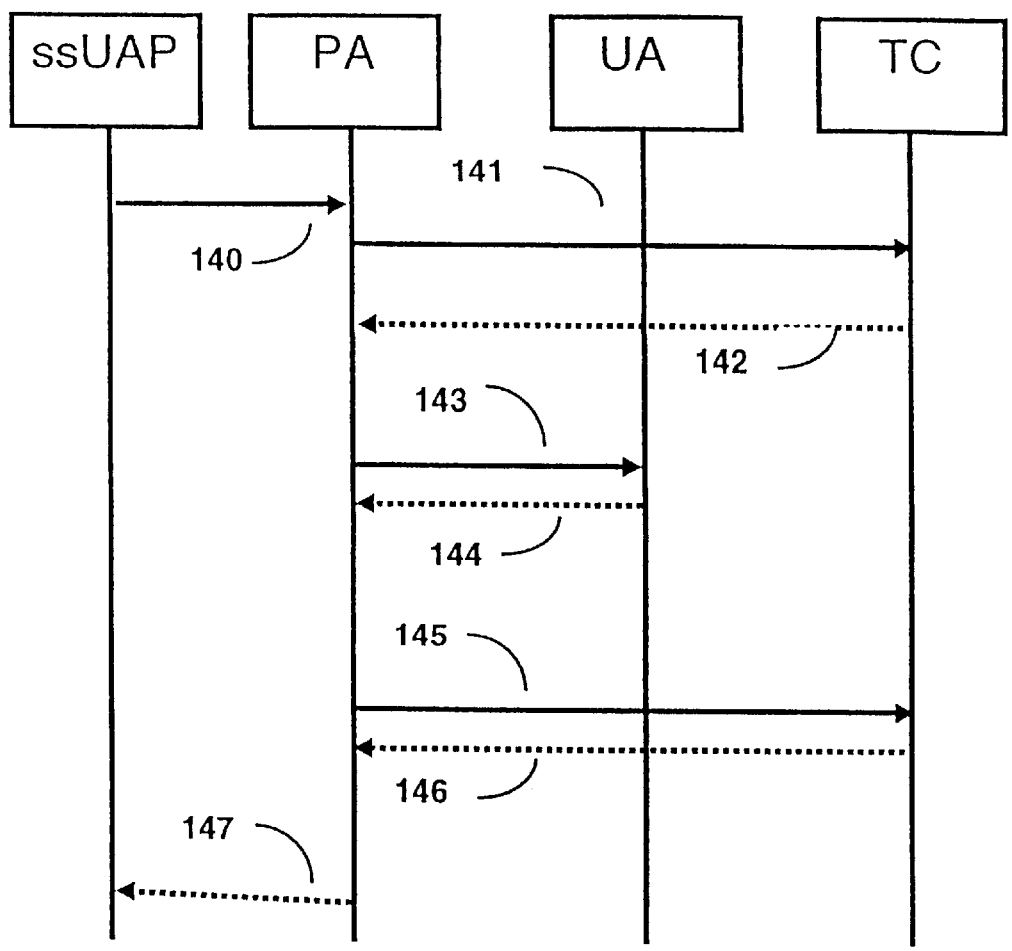
FIG. 6 shows a scenario that corresponds to an access session opening process.

FIG. 6 relates to the opening of an access session. In step (140) of this figure, it can be seen that from a component corresponding to a service session user application (ssUAP) a request is made to the initial interface of the provider agent (PA) for an access session opening.

The provider agent (PA), in step (141), asks the terminal configuration interface of the terminal controller (TC) for the terminal configuration, the response to which is received in step (142). Afterwards, the provider agent (PA) requests the user agent (UA) to establish a user context, which in the fixed terminal case it shall contain the consumer initial interface, and in the mobile terminal case it shall contain the terminal identity. This process and the answer from the user agent (UA) can be seen in steps (143) and (144).

In the case of a mobile terminal, the provider agent (PA) requests the terminal controller (TC) to register of an access session as can be seen in step (145), providing the interface reference necessary for ordering the registration of the access session, the reply to which is received in step (146). Once the access session has been registered, the provider agent (PA) informs the service session user application (ssUAP), as can be seen in step (147).

Figure 7:
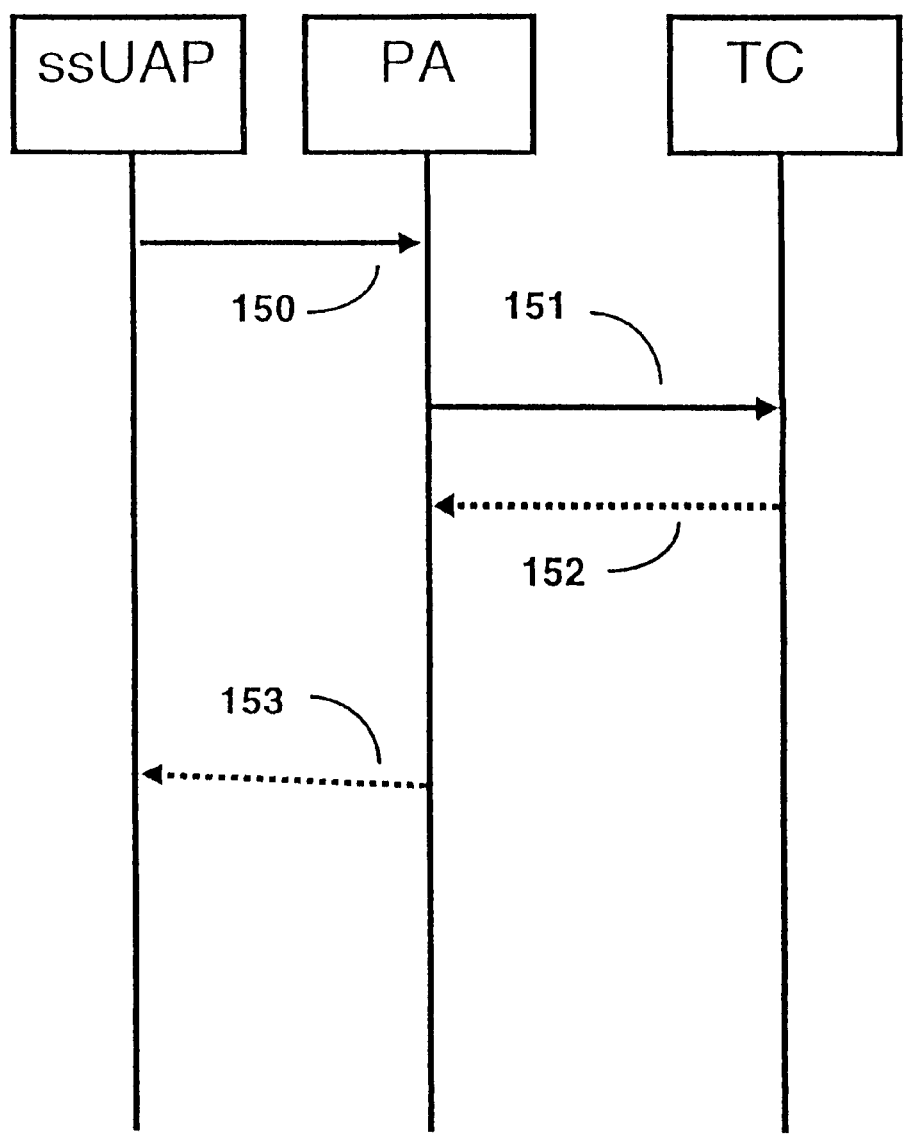
FIG. 7 shows a scenario that corresponds to an access session closing down process from a service session user application (ssUAP).

FIG. 7 corresponds to the access session closing down scenario from the service session user application (ssUAP). Step (150) shows that the service session user application (ssUAP) component invokes the end of the access session at the access interface of the provider agent (PA). This latter, in turn, according to step (151), invokes the access session deregistration at the access session registration interface of the terminal controller (TC), the reply to which is received in step (152). The provider agent (PA) then replies, in step (153), to the service session user application with the closing of the session.

Figure 8:
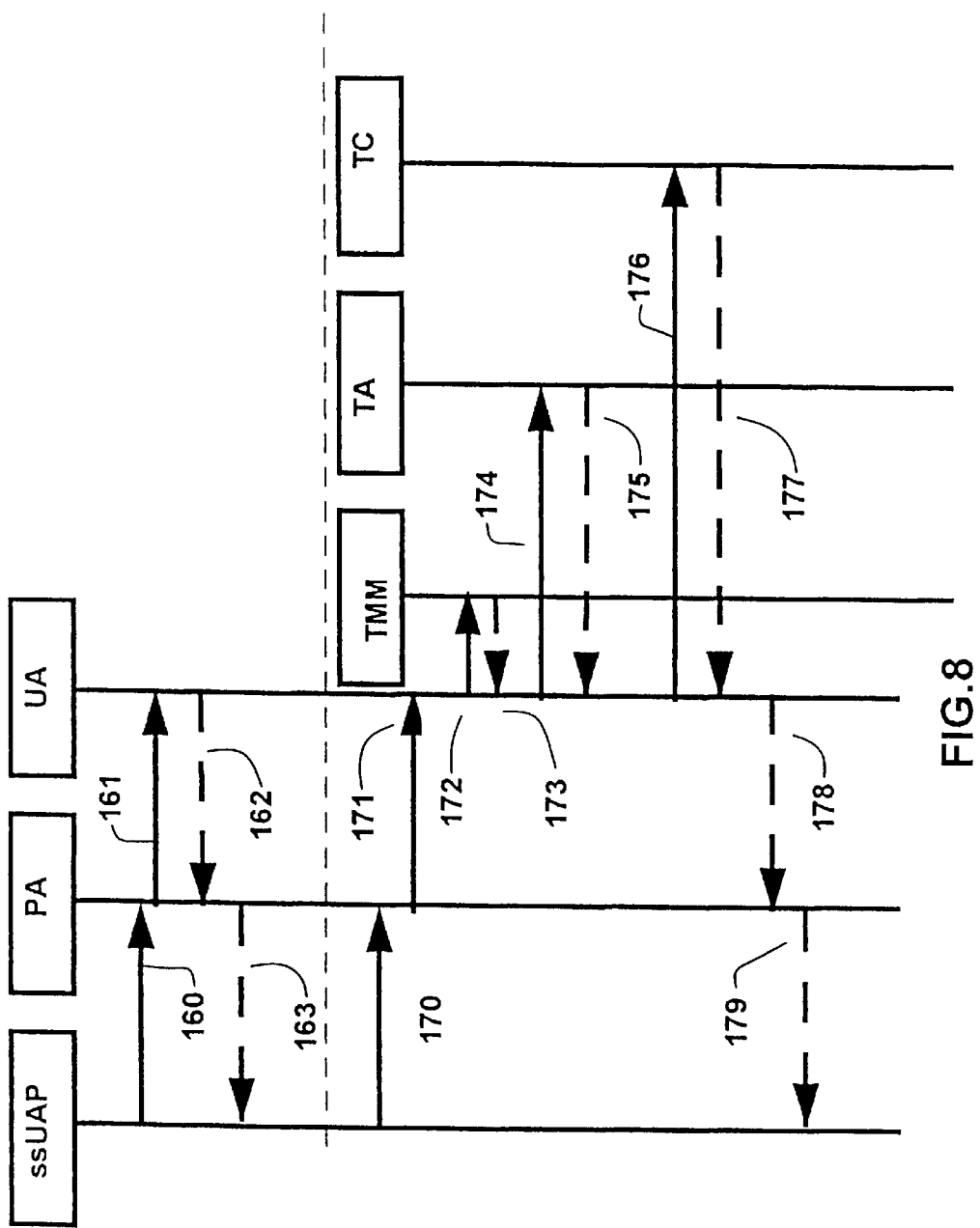
FIG. 8 shows a scenario that corresponds to a local and to a remote registration.

FIG. 8 shows the processes corresponding to a local user registration and a remote user registration. In the upper part of the figure the local user registration process can be seen, in which the service session user application, in step (160), invokes the reception of a local user registration for a service session invitation at the initial interface of the provider agent (PA). The provider agent (PA), in step (161), invokes the registration of the invitation in the provider access interface of the user agent (UA). The confirmation of acceptance of the local user registration is sent, in step (162), from the user agent to the provider agent (PA), and from the latter to the service session user application (ssUAP), in step (163).

In the case of a remote user registration, the service session user application, in step (170), invokes the initial interface of the provider agent (PA) the request for remote user registration for outside an access session. The provider agent (PA), in step (171), transfers the order to the user agent (UA). The latter asks for the reference of a terminal agent (TA) from the terminal mobility manager (TMM) based on a DTM terminal identity and receives reply, as can be seen in steps (172) and (173). Afterwards, in step (174), the user agent (UA) requests from the terminal agent (TA), the terminal controller interfaces references, and receives a reply in the form of a interface list as can be seen in step (175), obtaining the consumer initial interface reference in order to be able to use it within the access session established. The user agent then requests, in step (176), from terminal registration interface of the terminal controller (TC), that the remote user registration be added. The terminal controller (TC) admits or rejects the remote user registration depending on the conditions of said registration, and if admitted, a display presents a message stating that a remote user registration has been carried out from a specific terminal.

The confirmation that the remote registration has been affected is sent from the terminal controller (TC) to the user agent (UA), which maintains a terminal identity in the user context, and from the latter to the service session user application (ssUAP), as can be appreciated in steps (177), (178) and (179), respectively.

Figure 9:
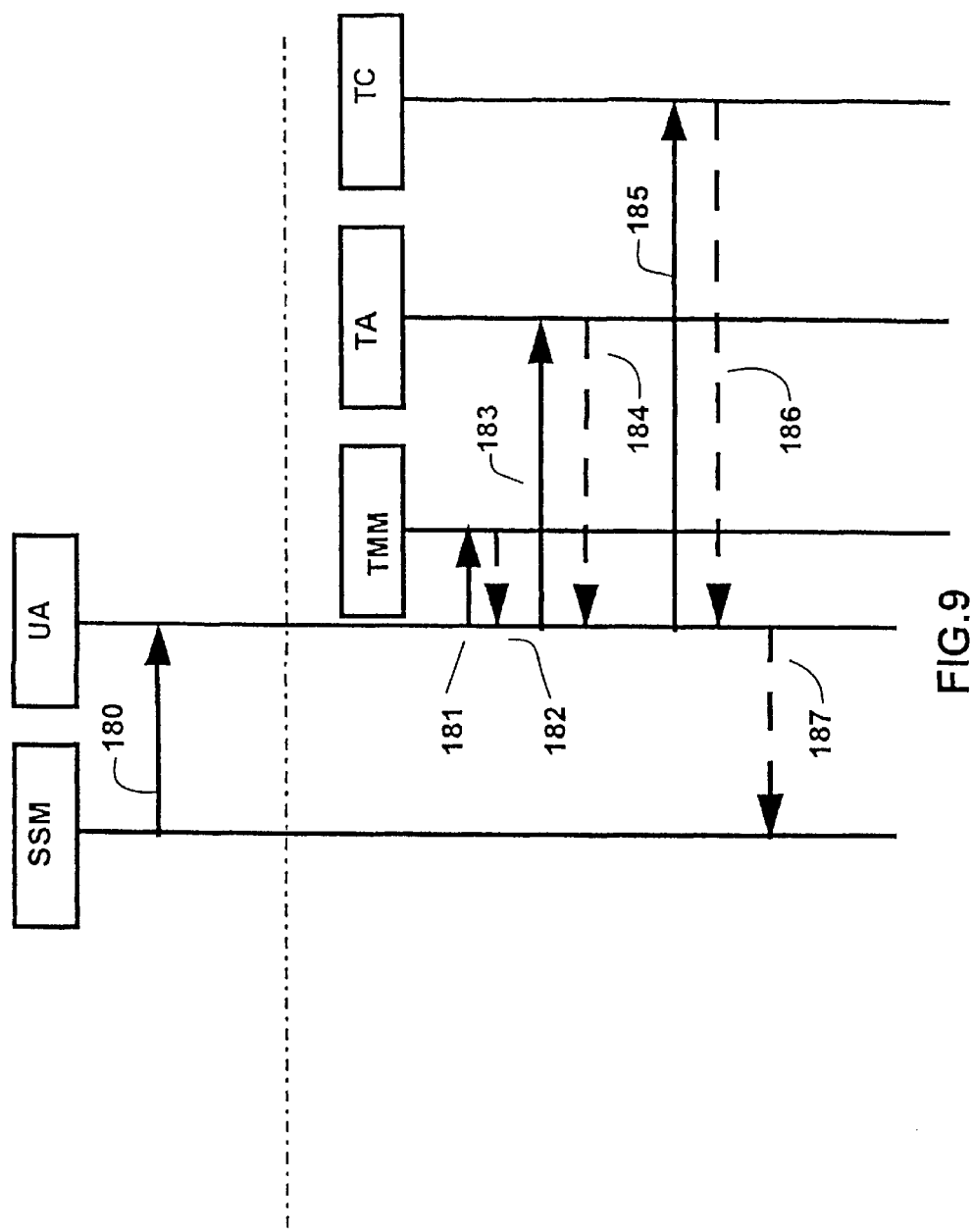
FIG. 9 shows a scenario that corresponds to an invitation process for a service session.

FIG. 9 corresponds to an invitation to a service session outside an access session. In step (180), the service sessions manager (SSM) invokes the request for an invitation at the invitation interface of the user agent (UA).

If the user agent has the terminal identity in the user context, then, in step (181), the user agent (UA) requests from the terminal mobility manager (TMM), the terminal agent reference, the reply to which is received in step (182). Afterwards, the user agent (UA) requests from the terminal agent (TA) the terminal controller interface reference, and receives the reply in the form of an interface list, as can be seen in steps (183) and (184). The user agent informs, in step (185), the user at the terminal indicated for the remote user registration that an invitation has arrived for a service session outside an access session and the mobile terminal controller (TC) displays on a display that an invitation has been launched to a user from a specific service.

The confirmation of the launching of the invitation is sent from the terminal controller (TC) to the user agent (UA) that holds this service session invitation, and from the latter to the service session manager (SSM), as can be appreciated in steps (186) and (187), respectively.

Figure 10:
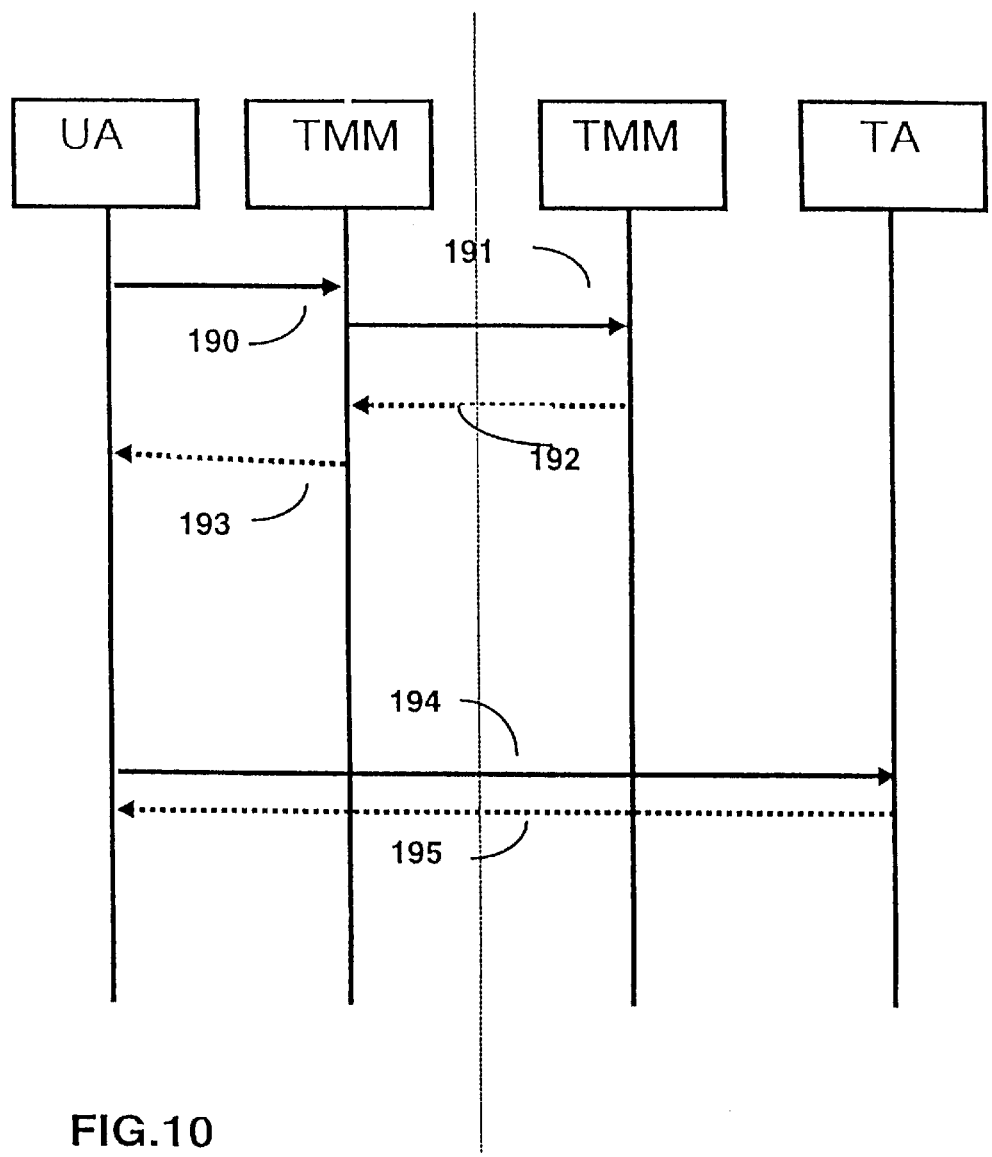
FIG. 10 shows a scenario that corresponds to a process of obtaining the reference of a terminal agent from another retailer domain.

FIG. 10 corresponds to the obtention of the reference of a terminal agent in another retailer domain. In step (190) it can be observed that the user agent (UA) asks the access interface of the terminal mobility manager (TMM) for the reference of a terminal agent (TA). Nevertheless, if the terminal identity belongs to another retailer domain, the terminal mobility manager (TMM) requests, in step (191), from the interface of the federated terminal mobility managers (TMM), said terminal agent (TA) reference, the reply to which is received in step (192). Once the reference has been received, the terminal mobility manager (TMM) of the indicated domain provides the reference obtained to the user agent (UA), as can be seen in step (193).

The user agent (UA) then, in step (194), requests the terminal agent (TA), the obtention of consumer initial interface reference of the terminal controller (TC), the reply to which is received in step (195).

Finally it is to be noted that the software components of the present invention are intended to be used as computer program comprising computer program code means. Therefore the present invention also relates to said computer program as well as a computer readable medium having said program recorded thereon, and comprising said computer program code means adapted to perform all the functions of said software components as well as the steps of the method related thereto when said program is run on a computer.

What is claim is:

1. A communications network system with discrete terminal mobility and remote user registration associated with said mobility, based on at least one network which comprises a set of user terminals, said network comprising at least one retailer domain (1), at least one consumer domain (2), and including in each domain software components in relation to subscription management, access and service sessions management and connection management, characterised in that it further comprises the following software components:

a) at least one terminal controller (TC) component, which is located in the consumer domain (2) and comprises the functions of:
  maintaining and updating configuration data of a terminal;
  checking authentication data of a terminal provider (TP), which accesses to the terminal controller (TC);
  maintaining and updating access interface references of a provider agent (PA) of the access sessions opened in the terminal;
  maintaining and updating conditions established by the terminal provider (TP) for admitting or rejecting remote user registrations; and
  terminal registration or deregistration;

b) at least one terminal mobility manager (TMM) component, which is located in any retailer domain (1) and comprises the functions of:
  controlling the terminal connection status and the updated value of interface references of terminal components when it is connected;
  creating or suppressing terminal agents (TA) which represent registered terminals in the retailer domains (1);
  checking discrete terminal mobility subscription;
  maintaining references of subscription agents (SubA) corresponding to all terminals with discrete mobility having discrete terminal mobility service subscription in a retailer domain (1); and
  obtaining references of terminal agents (TA) of terminals with discrete mobility in retailer domains (1) other than the retailer domain in which a service session request is launched.

2. A system, according to the preceding claim, characterised in that it further comprises at least one terminal controller front end (TCFE), which is located in the consumer domain (2) and serves as a front end interface in order that a terminal provider (TP), after having provided the correct authentication data, can have access to the functions of the terminal controller (TC) component in order to register or deregister a terminal, to handle the conditions of remote user registration and the terminal configuration.

3. A system, according to claim 1, characterised in that the terminal configuration contains data relative to a terminal identity, a terminal type, a mobility type and a network address.

4. A system, according to claim 1, characterised in that the obtention by the terminal mobility manager (TMM) of terminal agents (TA) references in retailer domains (1) other than the retailer domain in which a service session request is launched is done by locating the reference of each terminal with discrete mobility registered in said other retailer domains (1) for the purpose of actuating said terminal mobility manager (TMM) with terminal mobility managers (TMM) in said other retailer domains (1) corresponding to said terminal agents (TA), said reference being obtained on a basis of terminal identifiers, which contain an identifier of the corresponding retailer, received from user agents (UA).

5. A system, according to claim 1, characterised in that the terminal agent (TA) incorporates a series of instances that are created and suppressed by the terminal mobility manager (TMM) when a terminal with discrete mobility is registered or deregistered, each terminal agent (TA) instance incorporating the characteristics that:
  it comprises an access interface and an interface for updating the conditions of remote user registration;
  it represents a terminal with discrete mobility, registered in the retailer domain (1);
  it contains updated information on terminal controller (TC) interfaces to provide to a user agent (UA) in order to launch invitations to service sessions outside an access session; and
  it maintains remote user registration conditions up to date, which are furnished through the terminal controller (TC).

6. A system, according to claim 1, characterised in that the terminal controller (TC) provides a series of software interfaces which enable it to communicate with the remaining components of the network in order to make possible the corresponding operations, said interfaces comprising:

initial interface for the terminal controller front end (TCFE) component, supported by terminals with discrete mobility and suitable for providing a set of interface references of the terminal controller (TC) to be used by the terminal controller front end (TCFE) component;

access interface for the terminal controller front end (TCFE), supported by terminals with discrete mobility and suitable for providing the terminal controller front end (TCFE) component with operations associated with different interfaces of the terminal controller (TC) that can be facilitated to the terminal provider (TP) depending on whether the terminal provider is a propietor or a manager;

terminal configuration interface for the provider agent (PA), supported by both fixed and mobile terminals and said terminal configuration comprising, mainly, a terminal identity, a terminal type and a mobility type;

access session registration interface for the provider agent (PA), supported by terminals with discrete mobility and suitable for enabling the provider agents (PA) for registration or deregistration of their interface references of the access sessions in the terminals, said references being used by the terminal controller (TC) for closing down all access sessions opened in the terminal when the latter is disconnected, invoking the operation of access session termination in the provider agent;

network address interface for a terminal layer adapter (TLA), supported by fixed and mobile terminals and suitable for establishing network addresses in the processes of registration or deregistration of a terminal;

consumer initial interface for a user agent (UA), supported by terminals with discrete mobility and which is defined in a retailer reference point (Ret-RP) associated with the provider agents (PA);

terminal registration interface with the user agent (UA), supported by terminals with discrete mobility and suitable for obtaining information relative to the registration or deregistration of a terminal; and consumer terminal interface for the user agent (UA), supported by terminals with discrete mobility and that is defined in a retailer reference point (Ret-RP) associated with the provider agents (PA).

7. A system, according to claim 1, characterised in that the terminal controller (TC) requires a series of software interfaces in the components in its periphery which comprise:

access interfaces of the provider agents (PA), suitable for invoking in the provider agents (PA) by the terminal controller (TC), when a terminal is disconnected, an access session closing operation by using references received in these interfaces, thereby closing all sessions opened;

network address interface of the terminal layer adapters (TLA), suitable for invoking by the terminal controller (TC) the operations corresponding to the updating of the network address and the non-availability of the network address of the terminal layer adapter (TLA), when a registration or a deregistration of a terminal is being carried out;

initial interface of the terminal mobility manager (TMM), suitable for obtaining the reference of the access interface of the terminal mobility manager (TMM) after having checked the authentication data;

access interface of the terminal mobility manager (TMM), suitable for performing operations of registration or deregistration of a terminal; and interface for updating the conditions of remote user registration in the terminal agents (TA), the operation of which depends on the type of conditions of remote user registration supported.

8. A system, according to claim 6, characterised in that a first type of operations provided by the access interface for the terminal controller front end (TCFE) is associated with the registration or deregistration of terminals with discrete mobility, checking also the mobility type to ensure whether there is discrete mobility or not.

9. A system, according to claim 6, characterised in that a second type of operations provided by the access interface for the terminal controller front end (TCFE) is associated with the conditions of remote user registration.

10. A system, according to claim 6, characterised in that a third type of operations is associated with terminal configuration, in which terminal configuration values are established or modified, such as for example terminal identity, terminal type and network address.

11. A system, according to claim 1, characterised in that the terminal controller front end (TCFE) component requires an initial interface and an access interface in the terminal controller (TC), and supports another corresponding interface for message display.

12. A system, according to claim 1, characterised in that if the retailer domain (1) does not support the discrete terminal mobility service, then the terminal mobility manager (TMM) acts as an intermediary, without creating terminal agent (TA) instances between the user agent (UA) that requires a terminal agent (TA) reference based on a terminal identifier and the terminal mobility managers (TMM) belonging to a federated retailer domain in which the corresponding DTM terminal is subscribed.

13. A system, according to claim 1, characterised in that the terminal mobility manager (TMM) provides the following interfaces:

initial interface for the terminal controller (TC) of the terminals with discrete mobility, the operation of which consists of transmitting a subscription checking order to the subscription agent (SubA) and returning the reference of the access interface of the terminal mobility manager (TMM) if the checking is affirmative;

access interface for the terminal controller (TC) of the terminals with discrete mobility, the operations of which consist of terminal registration in which the terminal mobility manager (TMM) acts in association with a subscription agent (SubA) for checking the subscription of the terminal with discrete mobility, thus creating a terminal agent (TA) for representing the registered terminal if the checking proves affirmative; and of terminal deregistration using terminal identifiers in which the terminal mobility manager (TMM) suppresses the corresponding terminal agent (TA);

terminal access interface for the user agents (UA), which are located in the same retailer domain and the operation of which consists of a user agent (UA) in the retailer domain (1) being able to act in association with the terminal mobility manager (TMM) in order to ask for a reference for a terminal agent (TA) corresponding to the terminal identity used in the process of remote user registration;

interface with other federated terminal mobility managers (TMM); and information interface for subscription management for a subscriber manager (SubM) of the same retailer domain as where the discrete terminal mobility service is provided, the operation of which consists mainly of informing the terminal mobility manager (TMM) about a new terminal subscription or suppression and its subscription agent (SubA) reference.

14. A system, according to claim 1, characterised in that the terminal mobility manager (TMM) requires the following interfaces:

service use interfaces of the subscription agent (SubA), the operations of which are those of checking subscription and authentication data;

interfaces for federated terminal mobility managers (TMM) of the terminal mobility manager (TMM), suitable for establishing communication between different federated terminal mobility managers;

initial interface of terminal agents (TA), which is necessary only in the domain of the retailer providing DTM service and suitable for creating and suppressing terminal agents (TA) when a terminal is registered or deregistered.

15. A system, according to claim 1, characterised in that the terminal agent (TA) supports the following interfaces:

initial interface required by the terminal mobility manager (TMM) for creating and suppressing terminal agents (TA) and which is provided in the retailer domain that offers discrete terminal mobility service;

access interface for the user agent (UA) in the same retailer domain, the operation of which consists of obtaining a list of updated references of the terminal controller (TC) interfaces for the user agent (UA) of the user requesting it; and interface for updating the conditions of remote user registration for the terminal controller (TC) for updating data in the terminal agent (TA) associated with the conditions of remote user registration and established by the terminal provider.

16. Computer program comprising computer program code means adapted to perform all the functions of the software components of claim 1 when said program is run on a computer.

17. A computer readable medium having a program recorded thereon, said computer readable medium comprising computer program code means adapted to perform all the functions of the software components of claim 1 when said program is run on a computer.

18. Method for implementing discrete terminal mobility and remote user registration associated with said mobility in a communications network, said network comprising a set of user terminals, and being divided into at least one retailer domain (1) and at least one consumer domain (2), and including in each domain software components related to subscription management processes, access sessions, service sessions and connection management processes, characterised in that it comprises the steps of:

creating a subscription for a discrete terminal mobility service;

subscribing terminals with discrete terminal mobility associated with said service;

ordering a terminal registration;

creating a terminal agent (TA) that represents a discrete mobility terminal registered in a retailer domain (1);

updating, through a terminal controller (TC), a network address that requires a terminal layer adapter (TLA) each time a new terminal registration is carried out;

making a remote user registration in order to maintain, in a user agent (UA), an association between the user and a terminal identifier where service session invitations are received;

inviting a user outside an access session to a service session from a retailer domain (1);

notifying said invitation indicating the retailer associated with the invitation to the service session, by means of a message to the corresponding user on the terminal indicated in the remote user registration; and maintaining the invitation to the service session in the user agent (UA) for its subsequent participation in the invited service session.

19. Method, according to claim 18, characterised in that for deregistration the following steps are taken:

indication by the terminal controller (TC) to the terminal mobility manager (TMM) of the terminal deregistration, in which case said terminal mobility manager (TMM) suppresses a corresponding terminal agent (TA); and invocation by the terminal controller (TC), in the terminal layer adapter (TLA), of an operation of unavailability of network address residing in the latter and in the terminal controller (TC).

20. Method, according to claim 18, characterised in that, in a terminal registration, the terminal mobility manager (TMM) acts in association with a corresponding subscription agent (SubA) in order to check the discrete terminal mobility subscription.

21. Method, according to claim 18, characterised in that when a terminal is suppressed from a subscription management subsystem, a subscriber manager (SubM) informs the terminal mobility manager (TMM) about the suppression, the latter suppressing a corresponding subscription agent (SubA) reference and a corresponding terminal agent (TA).

22. Method, according to claim 18, characterised in that if the discrete mobility terminal is subscribed to the discrete mobility service in a federated retailer domain, the terminal mobility manager (TMM) acts in association with a corresponding terminal mobility manager (TMM) in the federated domain for requesting the terminal agent (TA) reference, or the indication that it does not exist.

23. Method, according to claim 18, characterised in that it also comprises the step of obtaining a terminal layer adapter (TLA) reference by using a naming service in order for the terminal layer adapter (TLA) to have the network address always updated.

24. Method, according to claim 18, characterised in that upon inviting a user outside an access session to a service session, a terminal controller (TC) reference of the corresponding domain is obtained by means of interaction between the terminal mobility manager (TMM) and the terminal agent (TA).

25. Computer program comprising computer program code means adapted to perform all the steps of the method of claim 18 when said program is run on a computer.

26. A computer readable medium having a program recorded thereon, said computer readable medium comprising computer program code means adapted to perform all the steps of the method of claim 18 when said program is run on a computer.

* * * * *